United States Patent [19]

Etchell

[11] Patent Number: 4,796,742
[45] Date of Patent: Jan. 10, 1989

[54] FLEXIBLE CLUTCH DRIVE PULLEY ASSEMBLY

[75] Inventor: Gordon Etchell, Downers Grove, Ill.

[73] Assignee: Pathfinder Graphic Associates Inc., Justice, Ill.

[21] Appl. No.: 63,816

[22] Filed: Jun. 19, 1987

[51] Int. Cl.⁴ .......................... F16D 11/00; F16D 3/60
[52] U.S. Cl. ................................ 192/67 P; 192/114 R; 464/98
[58] Field of Search ............... 192/67 P, 114 R; 464/98, 99; 474/158

[56] References Cited

U.S. PATENT DOCUMENTS

| | | |
|---|---|---|
| 1,323,423 | 12/1919 | Thomas . |
| 1,407,115 | 2/1922 | Bailey ............................ 192/67 P X |
| 1,947,052 | 2/1934 | Lack . |
| 2,045,572 | 6/1936 | Dow .......................... 192/114 R X |
| 2,619,211 | 11/1952 | Belden ........................... 192/67 P X |
| 2,684,142 | 7/1954 | Willyard et al. ........... 192/114 R X |
| 2,727,406 | 12/1955 | Opocensky ................. 192/114 R X |
| 2,745,267 | 5/1956 | Hagenlocher ..................... 464/99 X |
| 2,871,683 | 2/1959 | Hallewell . |
| 2,877,633 | 3/1959 | Hagenlocher ......................... 464/98 |
| 3,371,559 | 3/1968 | Scholl ......................... 192/114 R X |
| 3,494,147 | 2/1970 | Goody . |
| 3,703,817 | 11/1972 | Orwin ................................... 464/99 |
| 4,019,346 | 4/1977 | Fukuda . |
| 4,055,966 | 11/1977 | Fredericks ............................ 464/99 |
| 4,265,350 | 5/1981 | Vaughan ............................. 192/95 |
| 4,266,647 | 5/1981 | Staedeli ............................... 192/67 |

Primary Examiner—Rodney H. Bonck

[57] ABSTRACT

A drive pulley with a clutching device to engage or disengage a driven member, coupled with a flexible device to allow for axial, lateral, angular and end float errors. A drive pin assembly, including a spring-forced ball lock for securing a slide ring in an engaged or disengaged position with the driven pulley.

7 Claims, 2 Drawing Sheets

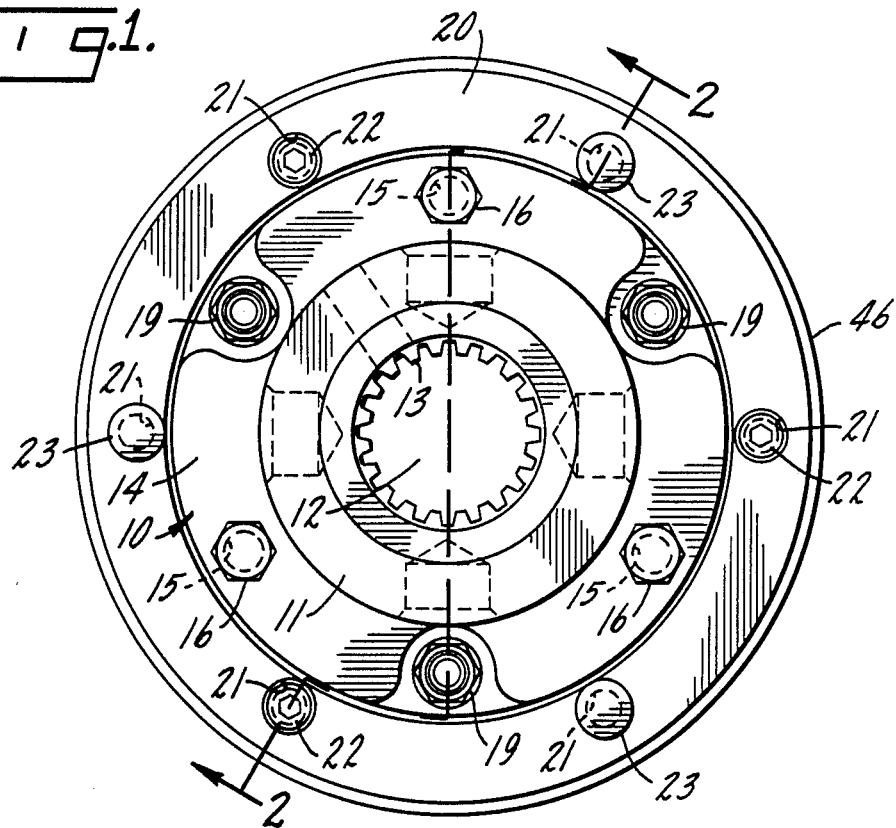

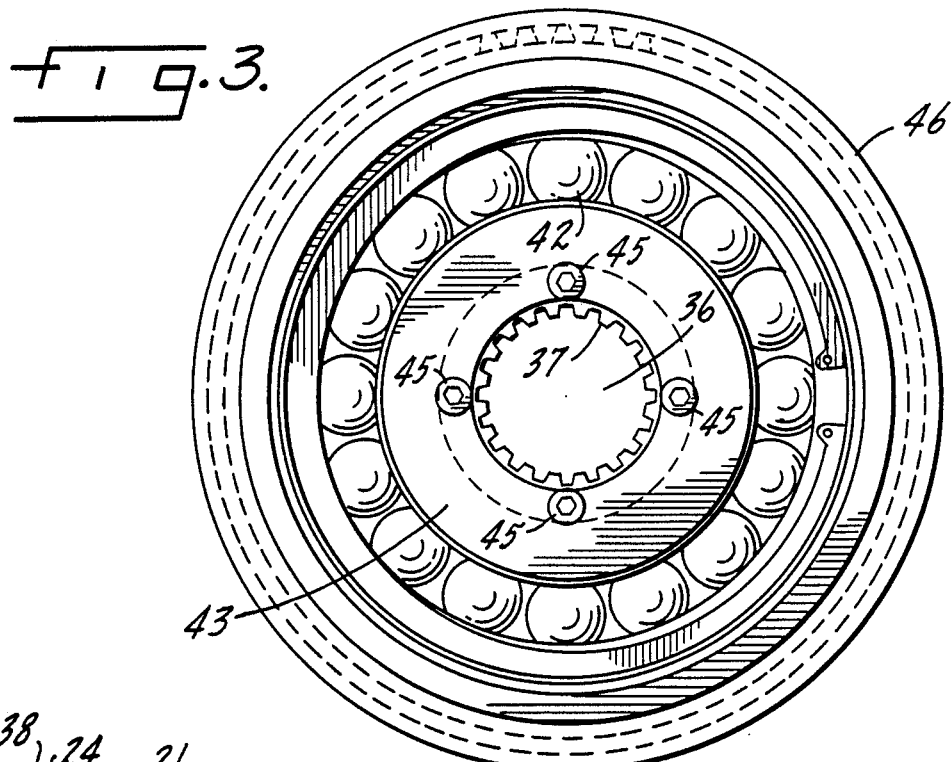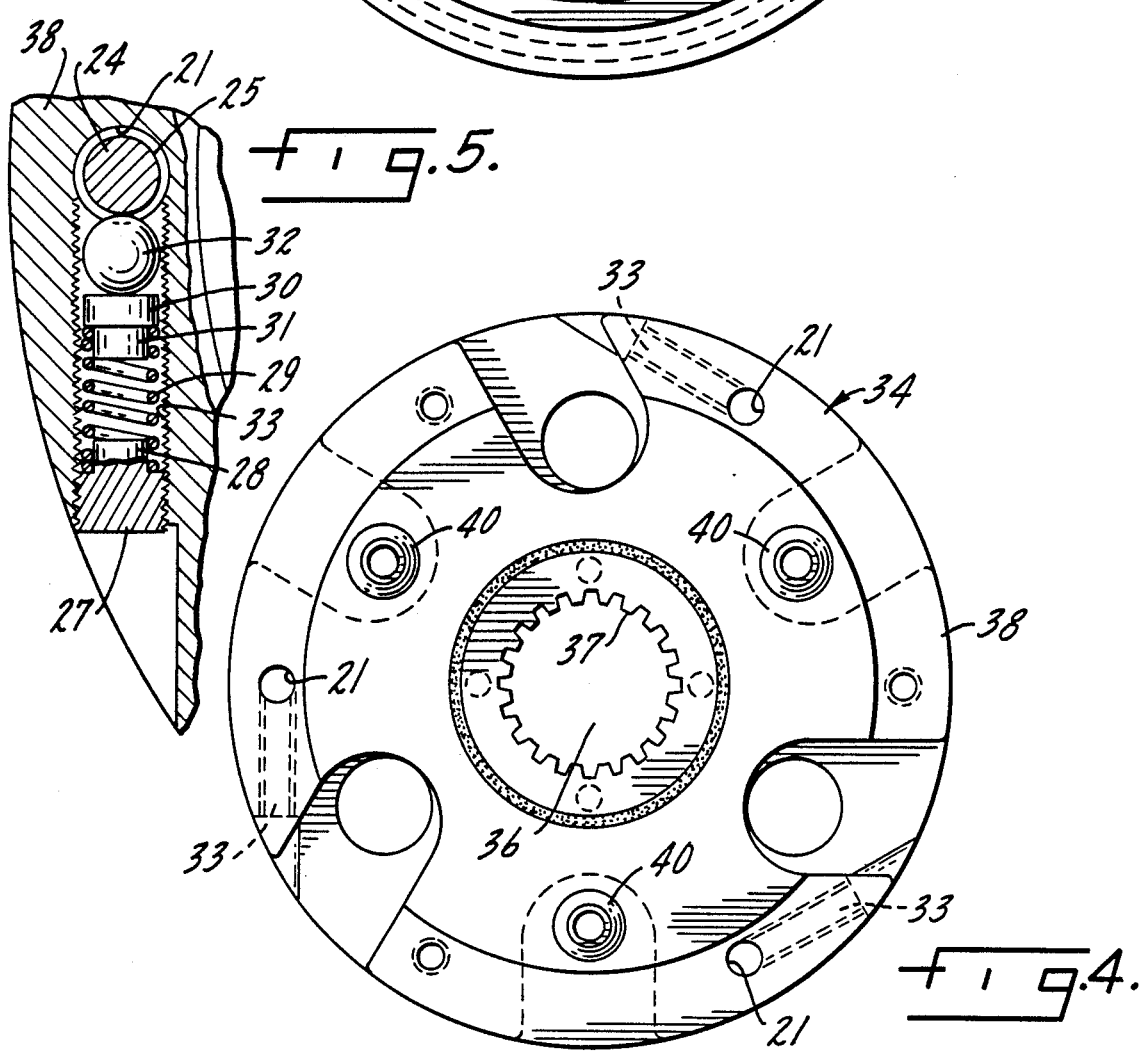

FLEXIBLE CLUTCH DRIVE PULLEY ASSEMBLY

FIELD OF INVENTION

This invention relates to torque transmission couplings, such as are used to transmit rotary power from a drive shaft to a pulley assembly.

Prior art torque transmission couplings comprised two coupling flexing elements at either end of a relatively inflexible torque transmission member. Such flexing members are generally made up of a plurality of flexible laminar elements held together in facing relationship by two oppositely beveled stand-off fastening members. Such a construction is shown and described in U.S. Pat. No. 3,494,147 to Goody dated Feb. 10, 1970, and U.S. Pat. No. 4,055,966 to Fredericks dated Nov. 1, 1977.

SUMMARY OF THE INVENTION

This invention is for a flexible clutch drive pulley assembly and includes a rigid coupling half having a splined or keyed bore, stepped to support a bearing with a flanged diameter. A drive pulley is supported on a bearing press fitted secured to the coupling half bearing seat. A slide ring is supported by equally spaced drive pins guided through the coupling flange to engage with drive holes in one side of the drive pulley. Equally spaced restriction coupling bolts are employed for retaining the outward disengagement movement of the slide ring. A flexible coupling half with connecting means is mounted to the rigid coupling half. A spring-forced ball lock assembly is provided for each drive pin for securing the slide ring in an engaged or disengaged position with respect to the drive pulley.

BRIEF DESCRIPTION OF THE DRAWINGS

The invention will be best understood by reference to the accompanying drawings showing the preferred form of construction by which the objects of the invention are achieved and in which:

FIG. 1 is an end elevational view of the flexible clutch drive pulley assembly;

FIG. 2 is a detailed sectional view taken on line 2—2 of FIG. 1;

FIG. 3 is an end elevational view of the driven pulley of the invention;

FIG. 4 is an elevational view taken on line 4—4 of FIG. 2 of the coupling half of the flexible clutch drive pulley assembly; and FIG. 5 is a fragmentary detailed sectional view of the spring-forced ball lock assembly for each drive pin of the flexible clutch drive pulley assembly.

GENERAL DESCRIPTION OF THE INVENTION

The flexible clutch drive pulley of this invention includes a half coupling 10 consisting of a hub 11 provided with a center bore 12, and internal spline teeth 13. An annular flange 14 extends about the hub 11 and is provided with a series of apertures 15 for the reception of connection bolts 16.

As shown in FIG. 2, the inner ends of certain of the apertures 15 have press fitted spherical head spacers 17 through which the bolts 16 pass, and upon the shank of which is journaled a disk pack 18 of a flexible member.

Certain other of the apertures 15 will receive bolts 16 having lock nuts 19 threaded upon shoulder bolts projected therethrough from an opposite direction as hereinafter described.

Encircling the flange 14 of the half coupling 10 is a slide ring 20. This slide ring 20 is provided with a series of apertures 21 through which a number of shoulder bolt 22 project and attach the slide ring to the rigid coupling half of the clutch pulley. The remaining apertures receive a series of drive pins 23 hereinafter described.

As seen in FIG. 2, the drive pins 23 have their shanks 24 relieved as at 25 and 26 to provide seats for a spring forced ball lock as shown in FIG. 5.

The ball lock comprises a threaded head 27 having a reduced longitudinal stud 28 adapted to be projected in the open end coils of one end of an expansion spring 29. A ball follower 30 having a like reduced longitudinal stud 31 is received in the opposite open end of the coils of the spring 29. A ball lock 32 is urged longitudinally by the spring 29 into contact with either of the reliefs 25 and 26 formed in the shank of the drive in 23 depending upon its position relative to the clutch assembly as hereinafter noted.

The ball lock assembly is contained in a threaded bore 33 formed in the flange of a rigid coupling half of the clutch pulley, which threaded ball extends tangently to the longitudinal length of the drive pins 23 and the apertures through which they project.

The rigid coupling half 34 provides a hub 35, the center bore 36 of which is placed in alignment with the center bore 12 of the half coupling 10. It too is provided with internal spline teeth 37 for operatively connecting to a driven shaft (not shown).

The rigid coupling half 34 includes an annular enlarged flange 38 having a circumference equal to that of the slide ring 20 and is adapted to be placed in fixed contact therewith by bolts 22.

The flange 38 provides a series of apertures 39 some of which have press fitted therein the spherical spacers 40 through which connecting bolts 16 project.

Thus, the half coupling 10 and the rigid coupling half 34

Thus, the coupling half 1 are connected together through the flexible disk pack 18. The spherical bearings permit either of the hubs to be slightly misaligned when assembled so as to provide a flexible drive connection therebetween. Thus, the flexible clutch drive assembly permits a contained connection notwithstanding any axial, angular, or lateral misalignment of a driven shaft (neither shown) which are respectively connected to the respective hubs through the spline teeth provided thereby.

The hub 34 is further reduced to provide a bearing seat 41 for a roller bearing assembly 42. A retainer ring 43 engages one side of the bearing assembly 42 and holds it against the shoulder 44 provided by the seat 41. A series of connecting bolts 45 attach the retainer ring 43 to the end of the hub 34. A pulley member 46 is rotatably placed upon the bearing 43 for rotation therewith. On one face of the pulley 46 there are formed holes 47 spaced 120° apart into which are press fitted bushings 48. These bushings 48 will receive the projected ends of the shank 24 on the drive pins 23 when the pulley is to be engaged with the flexible clutch and to be rotated thereby.

From the foregoing, it is seen that the coupling half 10 is connected to the rigid coupling 34 by the connecting bolts 16 which include the spherical spacers which press against the disk pack 18 on opposite sides thereof and by reason of this spherical head, permits the same to be flexed so as to compensate for misalignment between the two coupling halves.

The slide ring 20 is, in turn, connected to the coupling 34 by the bolts 22. It is through the slide ring 20 that the drive pins 23 project, and these drive pins are of a length so that when they are in their intermost position, such as shown in FIG. 2, will engage the pulley 46 for rotation with the clutch coupling halves.

When the drive pins 23 are in their drive position as shown in FIG. 2, the ball lock will be in its inner most threaded position so that the ball lock 32 will be urged by the spring 29 into the relief 25 formed in the shank 24 of the drive pin 23. When it is desired to disengage the drive connection, the ball lock is backed off and the drive pins 23 are longitudinally withdrawn from engagement with the pulley 42 and will be retained in the withdrawn position by the ball lock under the action of the spring 29 as it engages then the other relief 26 formed in the shank 24 of the drive pin 23.

What I claim as new and novel and desire to protect by Letters Patent is set forth in the appended claims:

1. A flexible clutch drive pulley assembly including:
   (a) a first half coupling connected to a drive shaft;
   (b) a second half coupling connected to a driven shaft;
   (c) a flexible connection between said half couplings accommodating misalignment between said drive shaft and said driven shaft;
   (d) a bearing member mounted on said second half coupling;
   (e) a pulley drum mounted for rotation on said bearing member;
   (f) a slide ring mounted upon the periphery of said first half coupling for rotation therewith;
   (g) a retractable drive connecting means carried by said ring and projecting into receptacles provided by said pulley drum for operatively connecting said pulley drum to said ring and said first half coupling for rotation therewith.

2. A flexible clutch drive pulley assembly as defined by claim 1 including means for locking said retractable drive connecting means into and out of operative connection between said slide ring and said pulley drum.

3. A flexible clutch drive pulley assembly as defined by claim 2 wherein said locking means comprises a spring urged ball adapted to be projected into reliefs formed in the shanks of said retractable drive connection means.

4. A flexible clutch drive pulley assembly as defined by claim 2 wherein said retractable drive connecting means comprises drive pins freely journaled in openings formed in said slide ring and adapted to have one end thereof projected into receptacles provided by said pulley drum for rotatably connecting said drum to said slide ring.

5. A flexible clutch drive pulley assembly as defined by claim 1 wherein said retractable drive connecting means comprises a series of drive pins freely journaled into openings formed in said slide ring and adapted to have one end projected into receptacles provided by said pulley drum for connecting the two together for rotation.

6. A flexible clutch drive pulley assembly as defined by claim 5 including means for locking said drive pins into and out of operative connection between said slide ring and said pulley drum.

7. A flexible clutch drive pulley assembly as defined by claim 6 wherein said locking means comprises a spring urged ball projected into reliefs formed in the shank of said drive pins so as to retain said drive pins into and out of driving connection with said pulley drum.

* * * * *